United States Patent [19]

Adams

[11] Patent Number: 4,767,308

[45] Date of Patent: Aug. 30, 1988

[54] MOULD FOR MOULDING AN ARTICLE

[75] Inventor: Alfred A. Adams, Bungay, England

[73] Assignee: Group Lotus PLC, Norwich, England

[21] Appl. No.: 793,804

[22] Filed: Jan. 21, 1986

[51] Int. Cl.⁴ .................... B29C 43/36; B29C 43/56
[52] U.S. Cl. .................... 425/405.1; 249/141; 249/161; 425/420; 425/441; 425/812; 425/DIG. 60
[58] Field of Search .............. 249/160, 161, 141; 425/DIG. 812, DIG. 817, 420, 405.1, 441, DIG. 60

[56] References Cited

U.S. PATENT DOCUMENTS

| | | | |
|---|---|---|---|
| 2,243,835 | 6/1941 | Brunner et al. | 425/812 |
| 2,304,461 | 12/1942 | Knowles | 425/812 |
| 2,627,641 | 2/1953 | Steele et al. | 425/160 |
| 2,976,571 | 3/1961 | Moslo | 249/141 |
| 3,193,884 | 7/1965 | Haynie et al. | 425/812 |
| 3,266,099 | 8/1966 | Bucy | 425/812 |
| 3,550,212 | 12/1970 | Gray | 249/141 |
| 3,970,732 | 7/1976 | Staats et al. | 425/817 R |
| 4,153,231 | 5/1979 | Hayakawa et al. | 425/817 R |
| 4,315,726 | 2/1982 | Semerdjiev et al. | 425/817 R |

FOREIGN PATENT DOCUMENTS 1432333 4/1976 United Kingdom .

*Primary Examiner*—Willard E. Hoag
*Attorney, Agent, or Firm*—Seidel, Gonda, Goldhammer & Abbott

[57] ABSTRACT

A two-part mould for moulding an article has the mould parts adapted to be moved together under vacuum to cause moulding material to be evenly distributed around a reinforcement structure. Sealing means for sealing the mold cavity against ambient atmosphere, comprises a primary seal operative during the movement of the mould parts, the action of the primary seal being assisted by a secondary seal which becomes effective when the mould parts reach the final closed position. A collection chamber is formed in one of the mould parts for collection of surplus resin through pinch-off means, including a flexible part, which closes off flow of resin into the collection chamber in the closed position, of the mould parts. The collection chamber is preferably located to permit drainage of resin back to the mould cavity until the pinch-off means becomes effective.

18 Claims, 1 Drawing Sheet

MOULD FOR MOULDING AN ARTICLE

FIELD OF THE INVENTION

The invention lies in the field of moulding and is particularly but not exclusively concerned with the moulding of an article in synthetic resin material, with or without a reinforcement structure, for example fibre reinforcement.

DESCRIPTION OF THE PRIOR ART

United Kingdom Patent Specification GB No. 1 432 333 discloses a method of moulding an article, the method having the step of applying a vacuum to a cavity defined between separate male and female mould parts having sealing means therebetween, the cavity containing a hardenable liquid moulding material, thereby drawing the mould parts together with relative movement thereof at at the sealing means, and causing the moulding material to flow in the cavity into the shape of the article to be moulded.

This Specification also discloses a mould for moulding an article, the mould comprising a male and female mould part shaped to be assembled to define a cavity therebetween, a seal for sealing the cavity against atmosphere, and an aperture in one of the mould parts for application of a vacuum to the cavity, the mould parts and the seal being arranged to permit drawing of the mould parts together with relative movement thereof at the seal, and flow of hardenable liquid mould material in the cavity into the shape of the article to be moulded, in response to the application of the vacuum to the cavity.

The mould of this prior art Specification is provided with a peripheral groove around the mould cavity and between this and the sealing means, which acts as a collection chamber for surplus moulding material which flows out of the mould cavity during the drawing together of the mould parts. The mould configuration is such that any resin which reaches the collection chamber from the mould cavity cannot return even though it may be needed to compensate for any instability that occurs within the cavity as the mould parts are drawn together. Such resin is wasted, and must be removed before the mould is re-used.

Each of the mould parts of the mould of Specification GB No. 1 432 333 has a flange extending outwardly from the periphery thereof and a skirt portion extending at right angles to the flange, the skirt portions being in spaced overlapping relation and having disposed therebetween a resilient sealing ring constituting the seal. The use of such a sealing arrangment presents difficulties in connection with the retention of the sealing ring during the movement together of the mould parts.

It is accordingly an object of the invention to provide a two-part mould, of which the parts can be moved together to effect distribution of a flowable moulding material within a moulding cavity, the mould having improved arrangements for dealing with any surplus moulding material in the moulding cavity.

It is a further object of the invention to provide such a mould with collecting means for such surplus moulding material which permits return thereof to the moulding cavity.

It is further an object of the invention to provide such a mould with a collection chamber for such excess moulding material, with pinch-off means for restricting and/or preventing flow of the excess moulding material from the moulding cavity.

It is an additional object of the invention to provide a two-part mould, of which the parts can be moved together to effect distribution of a flowable moulding material within a moulding cavity, the mould having immproved sealing means.

It is additionally an object of the invention to provide for such sealing means in the form of a primary and secondary seal.

SUMMARY OF THE INVENTION

In a mould for moulding an article having first and second mould parts movable together to reduce the volume of a moulding cavity defined between them, with means for introducing a flowable moulding material such as a thermosetting resin into the cavity and a collection chamber located outwardly of the cavity for receiving any excess moulding material during the movement of the mould parts, the invention provides pinch-off means acting to restrict flow of the moulding material into the collection chamber.

Preferably the pinch-off means prevent such flow entirely when the mould parts have closed together, to the relative position in which the volume of the moulding cavity is a minimum.

The pinch-off means is advantageously flexible and can thus comprise a ridge on one mould part engageable with a flexible member on the other mould part, so as to provide an effective seal. To avoid the use of adhesives or other fixing means, the flexible member can be configured as a strip of rectangular cross-section received in an elongate recess in the other mould part of outwardly tapered cross-section.

Also according to the invention, a mould for moulding an article comprises mould parts relatively movable together to reduce the volume of a moulding cavity between them so as to effect a desired distribution of a flowable moulding material within the moulding cavity, and a collection chamber communicating with the moulding cavity for collecting any excess moulding material, the collection chamber being so located with respect to the moulding cavity that the flowable moulding material can flow back from the collection chamber into the moulding cavity, preferably under gravity, to thereby compensate for any irregularity in the distribution of the material within the moulding cavity.

The invention further provides a mould for moulding an article, the mould having relatively movable first and second parts with sealing means operative to seal a mould cavity between the mould parts against ambient atmosphere, one mould part having first and second peripheral surfaces extending respectively generally parallel to and generally transversely of the direction of relative movement of the mould parts, and the other mould part having third and fourth peripheral surfaces extending respectively generally parallel to the first and second surfaces, and the sealing means comprising a primary seal operative between the first and third surfaces and secondary seal operative between the third and fourth surfaces. The primary sealing can advantageously comprise a sealing strip having at least one edge projecting from a recess formed in one of the first and third surfaces for wiping engagement with the other of these surfaces. Preferably, the strip is folded upon itself, as on a retaining ring received within the recess, to provide two projecting edges and thus a double seal.

The secondary seal can be constituted as a sealing ring received in a recess in one or other of the third and fourth surfaces for compressive engagement with the other of these surfaces. One or both of the first and second surfaces can be tapered inwardly in the direction of movement of the mould parts to the assembled position, so as to exert a wedging, centering, influence on the mould parts.

Figure 1:
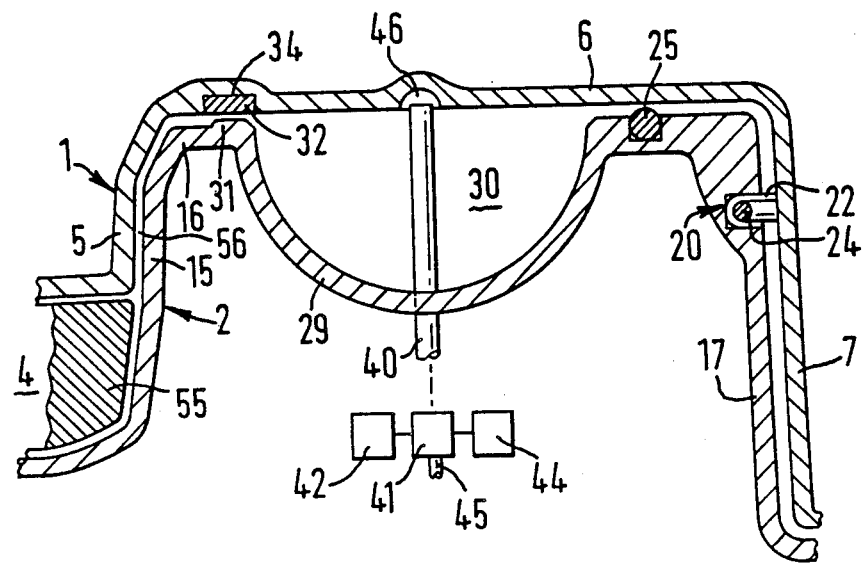
FIG. 1 is a partial cross-sectional side view of a first form of mould in accordance with the invention, in a position just short of closure of the mould parts.

Referring first to FIG. 1, the illustrated mould comprises a male part 1 and a female part 2 which are shaped to define between them a moulding cavity 4. The mould parts 1 and 2 are such that they can be moved together to reduce the volume of the cavity 4 until they define between them a cavity of a shape appropriate to the shape of the article it is desired to mould.

Around its periphery, the male mould part 1 has an upwardly extending inner skirt portion 5 joining with an outwardly extending annular flange 6 which at its outer periphery is bent downwardly to form an outer annular skirt portion 7. The female mould part 2 likewise has an upwardly extending inner skirt portion 15, an outwardly extending flange 16 again bent downwardly at its outer periphery to form an outer annular skirt portion 17.

The flanges 6 and 16 and outer skirt portions 7 and 17 have located between them sealing means for the mould, in the form of a primary seal 20 located between the skirt portions and a secondary seal 21 located between the flanges. The primary seal 20 comprises a strip 22 of rubber or other suitable rubber-like material folded lengthwise around a core in the form of a ring 24 of circular cross-section, again of rubber or like material. This primary seal assembly is received in an annular rectangular recess formed in one or other of the skirt portions, for example, the skirt portion 17 of the female mould part as shown with the ring 24 in the recess so that the free edges of the strip 22 are presented to the skirt portion 7, so providing a double seal. The secondary seal 21 comprises a ring 25 of spun-rubber cord or the like again received in a rectangular annular recess extending around one of the flanges, for example, the flange 16 as shown. The skirt portions 7,17 are not precisely cylindrical, but have a slight inward taper of say around 5° in the upward direction, so that a wedging action ensures as the mould parts move together towards the illustrated portion. During this movement the free longitudinal edges of the primary seal strip 22 wipe over the inner face of the skirt portion 7. As the movement together of the mould parts reaches completion, the overall seal is enhanced by compression of the secondary seal ring 25 against the flange 6.

The flange 16 of the female mould part 2 is formed with an annular recess or grooved portion 29 of approximately semi-circular cross-section which provides a collection chamber 30 for receiving surplus resin from the mould cavity 4 as the mould parts move together. The portion 29 is located in the flange 16 between the secondary sealing means 21 and a flexible "pinch-off" arrangement comprising an upstanding annular flat-topped ridge 31 opposed by a ring 32 of resilient material for example Neoprene, which is received in a groove 34 in the flange 6 with its exposed surface flush with the inner surface of the flange. The groove 34 is narrower at the surface of the flange 6 than internally so that the ring 32 is deformed correspondingly and thereby retained in place without the need to be otherwise secured as by adhesive.

At a suitable position around the periphery of the female mould part 2, a tube 40 sealingly extends through the flange portion at its lowest position. Externally of the mould, the pipe 40 connects to a three-way valve 41 by which the pipe can communicate selectively with vacuum from a vacuum source 42, compressed air from a pressure source 44 or with atmosphere through a pipe 45. Internally of the mould, the pipe 40 projects upwardly so that its open end is above the highest level at which surplus resin might be collected in the chamber 30, the flange 6 being provided with a recess 46 to freely accommodate the upper end of the pipe in the closed position of the mould.

Figure 2:
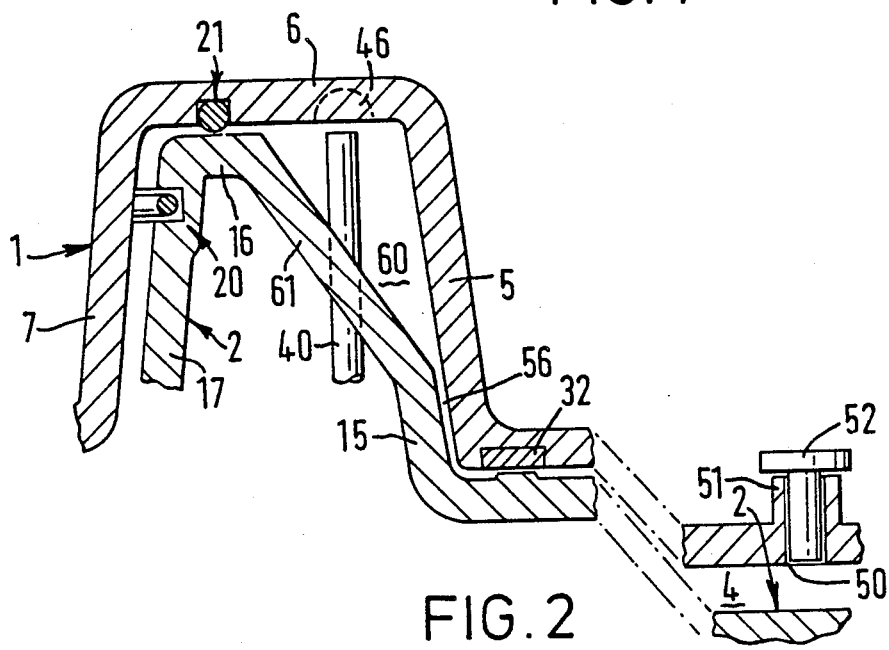
FIG. 2 is a like view of a second mould in accordance with the invention, again shown in a position just short of closure of the mould parts.
Figure 1:
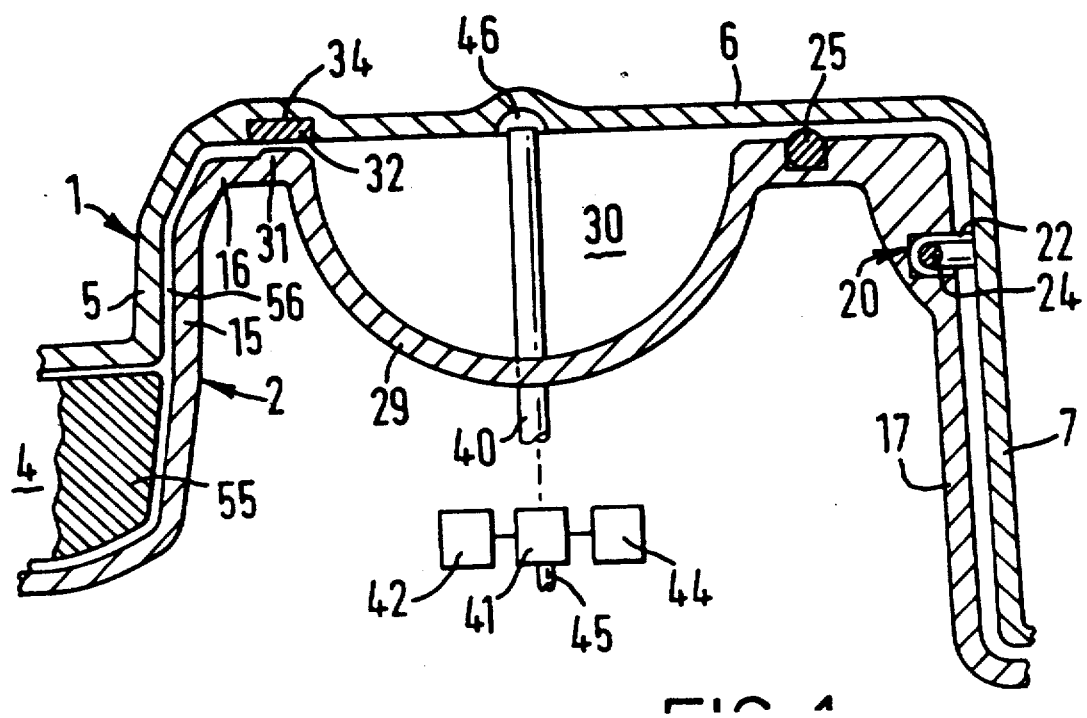

At its lowest point, the male mould part 1 has an inlet orifice 50 for resin (shown in FIG. 2 only) surrounded by a tubular boss 51 into which fits a shouldered stopper 52, the inner end of which is shaped to conform to the inner surface of the male mould part so that when the stopper is fully inserted, with its shoulder firmly abutting the edge of the boss, the inner surface shows a minimum of discontinuity in the region of the orifice.

The use of the illustrated mould to mould an article can be generally in accordance with the teaching of British Patent Specification No. 1 432 333, the contents of which are incorporated herein by reference. Thus in accordacne with the invention, the moulding surface of the open female mould part 2 is first provided with a gel coating or release agent. Any required reinforcement structure 55 is then positioned in the mould, and the male mould part, also coated with a gel or release agent, is placed in position in the female mould. The resin outlet orifice 50 is closed by the stopper 52 and the valve 41 is then operated so that vacuum from the source 42 is applied to the volume between the mould parts to draw them together to an initial or "oversized" position. The primary seal 20 maintains a sliding seal between the outer portions 7 and 17, but the secondary seal 21 has not yet become effective and the ridge 31 is spaced from the flexbile ring 34.

The vacuum within the mould is now released by operation of the valve 41 and a measured quantity of freshly mixed thermosetting resin, slightly in excess of the amount required to form the article to be moulded, is introduced into the mould through the resin inlet orifice 50. The stopper 52 is then firmly replaced.

Vacuum is then again applied to move the male mould part 1 slowly downwardly. During this mould closure movement, the resin within the cavity 4, collected initially at the lowest part of the cavity, is squeezed upwardly until the reinforcement structure 55 is completely surrounded by it. A small amount of excess resin is forced upwardly into the annular channel 56 between the inner skirt portions 5 and 15 of the mould parts during this stage, and if there is sufficient of this excess resin, it will flow through the flexible pinch-off to collect within the chamber 30. At the end of this mould movement, the secondary seal 21 has become engaged and the ridge 31 has engaged the flexible strip 34 to provide a pinch-off action preventing further upward flow of the resin.

When the resin in the mould has appropriately set, the setting time being known from the moulding conditions and the properties of the resin, the mould is opened so that the moulded article can be removed. The vacuum in the mould cavity 4 is first released by moving the valve 41 to connect to the pipe 45, and then compressed air from the source 44 is applied through the pipe 40 until the two mould parts 1 and 2 are separated. The compressed air supply is discontinued and the male mould part removed from the female part after which the moulded article is withdrawn from the latter. The mould shown in FIG. 2 generally resembles that of FIG. 1, and like parts are indicated by the same reference numerals as are used in FIG. 1. For a detailed explanation of the mould configuration and of its use, reference may be made to the foregoing description. It will be noted however that the secondary seal 21 is located in the flange 6 of the male mould part 1 instead of in the flange 16 of the female mould part 2.

More particularly, an excess resin collection chamber 60 is formed not as an annular groove in the flange 16, but by an inclined intermediate wall portion 61 between the inner skirt portion 15 and the flange 16. The chamber 55 is thus of generally triangular crosssection shape which tapers downwardly between the mould parts 1 and 2 to the annular channel 56 between the inner skirt portions 5 and 15 of the two mould parts. As a consequence of this, any resin received in the chamber 60 can return under gravity back into the mould cavity 4, during the mould movement prior to closure of the flexible pinch-off constituted by the ridge 31 and strip 32, to compensate for any instability within the moulding cavity. Moreover, the edge configuration of the female mould 2 is simplified and strengthened.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A mould for moulding an article, said mould comprising:
    first and second mould parts shaped to define a moulding cavity between the parts,
    means allowing relative movement of said first and second mould parts so that, upon said movement, volume of said moulding cavity changes between a first, minimum volume and a second larger volume,
    means for introducing flowable moulding material into said moulding cavity,
    means defining a collection chamber located outwardly of said moulding cavity, said collection chamber communicating with said moulding cavity to receive any excess flowable moulding material during said relative movement of said mould parts,
    means acting between said mould parts to restrict flow of said flowable moulding material into said collection chamber as said mould parts relatively move to a position corresponding to minimum moulding cavity volume,
    sealing means operative to said said moulding cavity and said collection chamber against ambient atmosphere throughout said movement of said mould parts between said first and second positions, and
    means for communicating said mould cavity with a vacuum source to effect said relative movement of said mould parts, said communicating means comprising a tube extending into said collection chamber with the tube opening above the level of the flowable moulding material in said chamber.

2. A mould for moulding an article, said mould comprising:
    first and second mould parts co-operating to define a moulding cavity therebetween,
    means allowing relative movement of said first and second mould parts so that, upon said movement, the volume of said moulding cavity changes between a first, minimum volume and a second larger volume,
    vacuum means for applying vacuum between the mould parts to draw the first and second mould parts together from said second to said first position and thus reduce the moulding cavity volume,
    means for moving the first and second mould parts apart from said first to said second position to increase the moulding cavity volume,
    means allowing the introduction of flowable moulding material into said cavity,
    means defining a collection chamber located outwardly of said mould cavity, said collection chamber communicating with said moulding cavity to receive any excess flowable moulding material during said relative movement of said mould parts,
    sealing means operative to seal said moulding cavity and said collection chamber against ambient atmosphere throughout said movement of said mould parts between said first and second positions, and
    means acting between said mould parts to restrict flow of said flowable moulding material into said collection chamber as said mould parts relatively move to a position corresponding to minimum moulding cavity volume.

3. The mould of claim 2 wherein said collection chamber is so located with respect to said moulding cavity that flowable moulding material can flow from said chamber to said cavity under gravity.

4. The mould of claim 2 wherein said means for moving said first and second mould parts apart comprise means for applying pressurised gas to the mould parts to effect said movement.

5. The mould of claim 2 further comprising means for communicating said mould cavity with a vacuum source to effect said relative movement of said mould parts, said communicating means comprising a tube extending into said collection chamber with the tube opening above the level of the flowable moulding material in said chamber.

6. The mould of claim 2 wherein said flow restriction means comprises a ridge on one of said mould parts engageable with a flexible member carried by the other of said mould parts.

7. The mould of claim 6 wherein said flexible member comprises a strip of rectangular cross-section, and said other of the mould parts has an elongate recess of outwardly tapered cross-section whereby to retain said strip therein.

8. A mould for moulding an article, said mould comprising:
    first and second mould parts shaped to define a moulding cavity between the parts, means allowing relative movement of said first and second mould parts so that, upon said movement, the voluem of said moulding cavity changes between a first, minimum volume and a second larger volume, means for introducing flowable moulding material into said moulding cavity, means defining a collection chamber located outwardly of said moulding cavity, said collection chamber communicating with said moulding cavity to receive any excess flowable moulding material during said relative movement of said mould parts, and sealing means operative to seal said moulding cavity and said collection chamber against ambient atmosphere throughout said movement of said mould parts between said first and second positions, and wherein said collection chamber communicates with said moulding cavity in a manner permitting reverse flow of the flowable moulding material from said collection chamber into said moulding cavity.

9. The mould of claim 8 wherein said collection chamber is defined between portions of said mould parts located above said moulding cavity whereby reverse flow of said flowable moulding material can occur under gravity.

10. The mould of claim 8 further comprising respective opposed portions on said mould parts at a location between said moulding cavity and said collection chamber whereby flow of flowable moulding material into said chamber is progressively restricted as said mould parts move together.

11. The mould of claim 8 further comprising a projection as one of said mould parts engageable with a mating resilient element carried by the other of said parts to thereby seal off said collection chamber from said moulding cavity.

12. The mould of claim 8 wherein said collection chamber extends around said moulding cavity, said mould further comprising sealing means operative between said mould parts to seal said chamber against ambient atmosphere, said sealing means extending around said collection chamber, a source of vacuum, and a pipe extending said source into said collection chamber to an outlet above the upper level of flowable moulding material therein, whereby said moulding parts are movable together under vacuum.

13. A mould for moulding an article, said mould comprising:

first and second mould parts, said first and second mould parts being shaped for relative movement into an assembled position wherein in a mould cavity is defined between said mould parts, sealing means operative in said assembled portions of said mould parts to seal said mould cavity against ambient atmosphere, first and second peripheral surface portions on said first mould part extending respectively generally parallel to and generally transversely of said direction of relative movement of said mould parts, and third and fourth peripheral surface portions on said second mould part extending respectively generally parallel to said first and second surface portions in said assembled position of said mould parts, said sealing means comprising primary seal means operative between said first and third surface portions and secondary seal means operative between said third and fourth surface portions, said primary seal means comprising sealing strip means having at least one edge projecting from a recess in one of said first and third surface portions for wiping engagement with the other of said first and third surface portions, said sealing strip means comprisng a strip folded upon itself to provide two of said projecting edges.

14. The mould of claim 13 wherein said strip is folded upon itself around a retaining ring achieved within said recess.

15. The mould of claim 13 wherein said secondary sealing means comprises a sealing ring received in a recess in one or other of said third and fourth surface portions for compressive engagement with the other of said third and fourth surface portions.

16. The mould of claim 13 wherein at least one of said first and second surface portions tapers inwardly in the direction of movement of the mould parts to the assembled position.

17. A mould for moulding an article, said mould comprising:

first and second mould parts shaped for relative movement together to reduce the volume of a moulding cavity defined between the parts, means allowing the introduction of flowable moulding material into said moulding cavity, means defining a collection chamber located outwardly of said moulding cavity, said collection chamber communicating with said moulding cavity to receive any excess flowable moulding material during said relative movement of said mould parts, and pinch-off means acting between said mould parts to cut-off flow of said flowable moulding material into said collection chamber as said mould parts move relatively to each other to approach a position corresponding to minimum moulding cavity volume, said pinch-off means comprising a ridge on one of said mould parts engageable with a flexible member carried by the other of said mould parts.

18. The mould of claim 17 wherein said flexible member comprises a strip of rectangular cross-section, and said other of the mould parts has an elongate recess of outwardly tapered cross-section whereby to retain said strip therein.

* * * * *

# REEXAMINATION CERTIFICATE (1552nd)

United States Patent [19]

Adams

[11] B1 4,767,308

[45] Certificate Issued Sep. 10, 1991

[54] MOULD FOR MOULDING AN ARTICLE

[75] Inventor: Alfred A. Adams, Bungay, England

[73] Assignee: Group Lotus plc, Norwich, England

Reexamination Request:
No. 90/002,103, Aug. 6, 1990

Reexamination Certificate for:
| Patent No.: | 4,767,308 |
| --- | --- |
| Issued: | Aug. 30, 1988 |
| Appl. No.: | 793,804 |
| Filed: | Jan. 21, 1986 |

[51] Int. Cl.$^5$ .................. B29C 43/36; B29C 43/56
[52] U.S. Cl. ..................... 425/405.1; 249/141; 249/161; 425/12; 425/420; 425/441; 425/812; 425/DIG. 60
[58] Field of Search ............ 425/405.1, 4 R, 817 R, 425/DIG. 60, 810, 812, 406, 408, 420, 441; 264/101, 102, DIG. 83; 249/141, 161

[56] References Cited

U.S. PATENT DOCUMENTS

| | | | |
| --- | --- | --- | --- |
| 3,055,058 | 9/1962 | Hartesveldt | 264/102 |
| 3,830,895 | 8/1974 | Theodorsen | 264/45 |
| 4,390,486 | 6/1983 | Hendry et al. | 425/817 R |
| 4,447,373 | 5/1984 | Chappell et al. | 264/102 |
| 4,479,914 | 10/1984 | Baumrucker | 264/101 |
| 4,496,131 | 1/1985 | Yang | 425/817 R |
| 4,497,754 | 2/1985 | Padoan | 264/1.4 |

FOREIGN PATENT DOCUMENTS

| | | |
| --- | --- | --- |
| 0001001 | 3/1979 | European Pat. Off. |
| 8529990.1 | 12/1985 | Fed. Rep. of Germany |
| 1424423 | 12/1966 | France |
| 2205978 | 5/1974 | France |
| 791552 | 3/1958 | United Kingdom |
| 1008136 | 10/1965 | United Kingdom |
| 1319477 | 6/1973 | United Kingdom |
| 1403165 | 8/1975 | United Kingdom |

*Primary Examiner*—Willard E. Hoag

[57] ABSTRACT

A two-part mould for moulding an article has the mould parts adapted to be moved together under vacuum to cause moulding material to be evenly distributed around a reinforcement structure. Sealing means for sealing the mold cavity against ambient atmosphere, comprises a primary seal operative during the movement of the mould parts, the action of the primary seal being assisted by a secondary seal which becomes effective when the mould parts reach the final closed position. A collection chamber is formed in one of the mould parts for collection of surplus resin through pinch-off means, including a flexible part, which closes off flow of resin into the collection chamber in the closed position, of the mould parts. The collection chamber is preferably located to permit drainage of resin back to the mould cavity until the pinch-off means become effective.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13-16 is confirmed.

Claims 1, 2, 8, 9, 10, 11, 12 and 17 are cancelled.

Claims 3-6 and 18 are determined to be patentable as amended.

Claim 7, dependent on an amended claim, is determined to be patentable.

New claims 19-24 are added and determined to be patentable.

3. The mould of claim [2] *20* wherein said collection chamber is so located with respect to said moulding cavity that flowable moulding material can flow from said chamber to said cavity under gravity.

4. The mould of claim [2] *20* wherein said means for moving said first and second mould parts apart comprise means for applying pressurized gas to the mould parts to effect said movement.

5. The mould of claim [2] *20* further comprising means for communicating said mould cavity with a vacuum source to effect said relative movement of said mould parts, said communicating means comprising a tube extending into said collection chamber with the tube opening above the level of the flowable moulding material in said chamber.

6. The mould of claim [2] *20* wherein said flow restriction means comprises a ridge on one of said mould parts engageable with a flexible member carried by the other of said mould parts.

18. The mould of claim [17] *24* wherein said flexible member comprises a strip of rectangular cross-section, and said other of the mould parts has an elongate recess of outwardly tapered cross-section whereby to retain said strip therein.

*19. A mould for moulding an article, said mould comprising:*

*first and second mould parts shaped to define a moulding cavity between said mould parts,*

*means for allowing relative movement of said first and said second mould parts between a first position and a second position so that, upon said movement, the volume of said moulding cavity changes between a first, minimum volume and a second larger volume,*

*means for introducing a flowable moulding material into said moulding cavity,*

*means defining a collection chamber located outwardly of said moulding cavity, said collection chamber communicating with said moulding cavity to receive any excess flowable moulding material flowing from said moulding cavity during said relative movement of said first and said second mould parts from said second position to said first position,*

*means acting between said first and said second mould parts to restrict the flow of said flowable moulding material into said collection chamber as said first and said second mould parts move into said first position corresponding to said minimum moulding cavity volume,*

*sealing means operative to seal said moulding cavity and said collection chamber against ambient atmosphere throughout said movement of said first and said second mould parts between said first and said second positions, and*

*means for communicating said moulding cavity with a vacuum source to effect said relative movement of said first and said second mould parts, said communicating means comprising a tube extending into said collection chamber, said tube defining an opening located above the level of said flowable moulding material in said collection chamber,*

*wherein said means acting between said first and said second mould parts being a ridge on one of said first or said second mould parts, said ridge being disposed:*

*(a) between said first and said second mould parts and*

*(b) between said collection chamber and said moulding cavity, and wherein said sealing means is positioned to engage with said ridge to restrict the flow of said flowable moulding material from said moulding cavity.*

*20. A mould for moulding an article, said mould comprising:*

*first and second mould parts co-operating to define a moulding cavity therebetween,*

*means for allowing relative movement of said first and second mould parts between a first position and a second position so that, upon said movement, the volume of said moulding cavity changes between a first, minimum volume and a second larger volume,*

*vacuum means for applying vacuum between said first and said second mould parts to draw said first and second mould parts together from said second to said first position and thus to reduce the volume of said moulding cavity,*

*means for moving said first and second mould parts apart from said first to said second position to increase the volume of said moulding cavity,*

*means for introducing a flowable moulding material into said moulding cavity,*

*means defining a collection chamber located outwardly of said moulding cavity, said collection chamber communicating with said moulding cavity to receive any excess flowable moulding material during said relative movement of said first and said second mould parts from said second position to said first position,*

*sealing means operative to seal said moulding cavity and said collection chamber against ambient atmosphere throughout said movement of said first and said second mould parts between said first and second position, and*

*means acting between said first and second mould parts to restrict the flow of said flowable moulding material into said collection chamber as said first and said second mould parts move to said first position corresponding to said moulding cavity minimum volume,*

*wherein said means acting between said first and said second mould parts being a ridge on one of said first or said second mould parts, said ridge being disposed:*

(a) between said first and said second mould parts and (b) between said collection chamber and said moulding cavity, and wherein said sealing means is positioned to engage with said ridge to restrict the flow of said flowable moulding material from said moulding cavity.

21. A mould for moulding an article, said mould comprising:
first and second mould parts shaped to define a moulding cavity between said mold parts,
means for allowing relative movement of said first and said second mould parts between a first and a second position so that, upon said movement, the volume of said moulding cavity changes between a first, minimum volume and a second larger volume,
means for introducing a flowable moulding material into said moulding cavity,
means defining a collection chamber located outwardly of said moulding cavity, said collection chamber communicating with said moulding cavity to: (a) receive any excess flowable moulding material during said movement of said first and said second mould parts from said second to said first position, and (b) permit the reverse flow of said flowable moulding material from said collection chamber into said moulding cavity,
sealing means operative to seal said moulding cavity and said collection chamber against ambient atmosphere throughout said movement of said first and said second mould parts between said first and second positions, and
restrictive opposed portions on said first and said second moulding parts, said opposed portions being disposed between said collection chamber and said moulding cavity, and said opposed portions cooperate with one another and said sealing means whereby the flow of said flowable moulding material into said collection chamber from said moulding cavity is progressively restricted as said first and said second mould parts move from said second position to said first position.

22. A mould for moulding an article, said mould comprising:
first and second mould parts shaped to define a moulding cavity between said mould parts,
means for allowing relative movement of said first and said second mould parts between a first and a second position so that, upon said movement, the volume of said moulding cavity changes between a first, minimum volume and a second larger volume,
means for introducing a flowable moulding material into said moulding cavity,
means defining a collection chamber located outwardly of said moulding cavity, said collection chamber communicating with said moulding cavity to: (a) receive any excess flowable moulding material during said relative movement of said first and said second mould parts from said second to said first position and (b) permit the reverse flow of said flowable moulding material from said collection chamber into said moulding cavity,
sealing means operative to seal said moulding cavity and said collection chamber against ambient atmosphere throughout said movement of said first and said second mould parts between said first and second positions, and
a projection on one of said first or said second mould parts, said projection being disposed: (a) between said first and said second mould parts and (b) between said collection chamber and said moulding cavity, said projection being positioned to engage with a mating resilient element carried by the other of said first or second mould parts to seal off said collection chamber from said moulding cavity and restrict the flow of said flowable moulding material from said moulding cavity into said collection chamber.

23. A mould for moulding an article, said mould comprising:
first and second mould parts shaped to define a moulding cavity between said mould parts,
means for allowing relative movement of said first and said second mould parts between a first and a second position so that, upon said movement, the volume of said moulding cavity changes between a first, minimum volume and a second larger volume,
means for introducing a flowable moulding material into said moulding cavity,
means defining a collection chamber located outwardly of said moulding cavity, said collection chamber communicating with said moulding cavity and extending around said mould cavity to: (a) receive any excess flowable moulding material during said movement of said first and said second mould parts from said second to said first position, and (b) permit the reverse flow of said flowable moulding material from said collection chamber into said moulding cavity,
sealing means operative between said mould parts to seal said moulding cavity and said collection chamber against ambient atmosphere throughout said movement of said first and said second mould parts between said first and second positions, said sealing means extending around (a) said collection chamber, (b) a vacuum source, and (c) a pipe extending said vacuum source into said collection chamber to an outlet located above the upper level of said flowable moulding material therein, whereby said first and second mould parts are movable from said second position to said first position by said vacuum source.

24. A mould for moulding an article, said mould comprising:
first and second mould parts shaped to define a moulding cavity therebetween, said first and said second mould parts being movable between a first and a second position so that, upon said movement, the volume of said moulding cavity changes between a first minimum volume and a second larger volume,
means for allowing the introduction of a flowable moulding material into said moulding cavity,
means defining a collection chamber located outwardly of said moulding cavity, said collection chamber communicating with said moulding cavity to receive any excess flowable moulding material during said relative movement of said first and said second mould parts from said second to said first position, and
pinch-off means acting between said first and said second mould parts, said pinch-off means being disposed: (a) between said first and second mould parts and (b) between said collection chamber and said moulding cavity to cut-off the flow of said flowable moulding material into said collection chamber from said moulding cavity as said first and said second mould parts move towards said first position corresponding to said minimum volume of said moulding cavity,
said pinch-off means comprising a ridge on one of said first or said second mould parts, said ridge being engagable with a flexible member carried by the other of said first or said second mould parts when said mould parts move together towards said minimum volume of said molding cavity.

* * * * *